(12) United States Patent  
Drennen et al.

(10) Patent No.: US 8,931,599 B2
(45) Date of Patent: Jan. 13, 2015

(54) DAMPING END-STOP OF ELECTRIC BRAKING APPARATUS

(71) Applicants: David Drennen, Bellbrpook, OH (US); Harald Klode, Centerville, OH (US); Robert French, Beavercreek, OH (US); Kevin Rehfus, Troy, OH (US)

(72) Inventors: David Drennen, Bellbrpook, OH (US); Harald Klode, Centerville, OH (US); Robert French, Beavercreek, OH (US); Kevin Rehfus, Troy, OH (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 134 days.

(21) Appl. No.: 13/666,470

(22) Filed: Nov. 1, 2012

(65) Prior Publication Data

US 2014/0116820 A1    May 1, 2014

(51) Int. Cl.
*F16D 55/08*    (2006.01)

(52) U.S. Cl.
USPC .......................................... 188/72.8; 188/158

(58) Field of Classification Search
USPC ............... 188/72.7, 72.8, 156, 157, 158, 161, 188/162; 74/89.23, 89.34, 89.37, 89.42
See application file for complete search history.

(56) References Cited

U.S. PATENT DOCUMENTS

| 2,715,341 | A * | 8/1955 | Hogan ........................ 74/89.37 |
| 2,738,685 | A * | 3/1956 | Hartz et al. .................. 74/89.37 |
| 5,896,956 | A * | 4/1999 | Lin et al. ..................... 188/24.22 |
| 7,347,305 | B2 | 3/2008 | Klode et al. |
| 7,467,692 | B2 | 12/2008 | Ether |
| 7,932,794 | B2 | 4/2011 | Suter |
| 8,109,165 | B2 | 2/2012 | Himmelmann |
| 8,262,531 | B2 | 9/2012 | Himmelmann et al. |
| 2005/0082908 | A1 | 4/2005 | Klode et al. |
| 2005/0241905 | A1* | 11/2005 | Duwel et al. ............... 192/70.28 |
| 2007/0261926 | A1* | 11/2007 | Dalton et al. ................ 188/72.8 |
| 2009/0107268 | A1 | 4/2009 | Suter |
| 2011/0146446 | A1 | 6/2011 | Himmelmann et al. |

FOREIGN PATENT DOCUMENTS

| EP | 1279854 B1 | 11/2006 |
| EP | 1867567 B1 | 6/2007 |
| EP | 1798123 B1 | 9/2008 |
| EP | 2302262 A2 | 9/2010 |
| EP | 2343465 A1 | 12/2010 |

* cited by examiner

*Primary Examiner* — Thomas J Williams
(74) *Attorney, Agent, or Firm* — Cantor Colburn LLP

(57) ABSTRACT

An electric braking apparatus is provided and includes an electromechanical actuator (EMA) configured to apply an axial load on a brake stack and a damping end-stop. The damping end-stop is configured to transmit torque into the EMA and includes an end cap, a screw disposed such that a longitudinal axis about which the screw is rotatable extends through the end cap, a nut threadably engaged with the screw and movable with the end cap relative to the screw with screw rotation and a spring element anchored on the end cap to resist the screw rotation beyond a predefined position.

18 Claims, 3 Drawing Sheets

DAMPING END-STOP OF ELECTRIC BRAKING APPARATUS

BACKGROUND OF THE INVENTION

The subject matter disclosed herein relates to electric braking apparatuses and, more particularly, to electric braking apparatuses with damping end-stops.

Electric braking for aerospace applications requires the use of electro-mechanical actuators (EMAs) to apply axial loads on brake stacks. System requirements mandate that these actuators be able to fully retract on command. The fully retracted position of an EMA is defined by an "end-stop."

EMAs often make use of ballscrews to convert torque to the desired axial force necessary to operate the brake stacks. When EMAs use ballscrews, the ballscrews are often designed with an end-stop feature that is used to positively stop the EMA in its fully retracted position. The end-stop feature allows the EMA to have "re-homing" position control as well as a known service position for brake stack replacement.

Among the requirements for the end-stop feature is the requirement that the end-stop feature be capable of stopping a full-force retract command in the event of a software failure. Typically, end-stop features must be designed with substantial tab wall thicknesses as the forces generated due to a full-force retract command include motor and system inertia loading that can both create substantial impact forces. These impact forces must be absorbed by the end-stop features and mechanical or material failures of end-stop features due to overloading are common.

In some cases, the impact forces can be sudden and cause the ballscrew balls to accelerate and wedge into track grooves whereby the ballscrew is prevented from turning. Also, the impact forces can cause excess forces to be exerted on the EMA gearing and motor, which could lead to an EMA jam. If an end-stop feature fails, the ballscrew has the potential to disassemble itself and fall out of the actuator. This could lead to foreign object damage (FOD), which is a failure mode that is unacceptable in the Aerospace industry. Thus, end-stop features are often provided with excessive design margins that lead to larger and heavier actuator packages.

BRIEF DESCRIPTION OF THE INVENTION

According to one aspect of the invention, an electric braking apparatus is provided and includes an electromechanical actuator (EMA) configured to apply an axial load on a brake stack and a damping end-stop. The damping end-stop is configured to transmit torque into the EMA and includes an end cap, a screw disposed such that a longitudinal axis about which the screw is rotatable extends through the end cap, a nut threadably engaged with the screw and movable with the end cap relative to the screw with screw rotation and a spring element anchored on the end cap to resist the screw rotation beyond a predefined position.

According to another aspect of the invention, a damping end-stop for coupling to an electro-mechanical actuator of an electric braking apparatus is provided. The damping end-stop includes an end cap, a screw disposed such that a longitudinal axis about which the screw is rotatable extends through the end cap, a nut threadably engaged with the screw and movable with the end cap relative to the screw with screw rotation and a spring element anchored on the end cap to resist the screw rotation beyond a predefined position.

According to yet another aspect of the invention, an electric braking apparatus is provided and includes an electromechanical actuator (EMA) configured to apply an axial load on a brake stack and a damping end-stop configured to transmit torque into the EMA. The damping end-stop includes an end cap, a screw disposed such that a longitudinal axis about which the screw is rotatable extends through the end cap, a nut threadably engaged with the screw and movable with the end cap relative to the screw with screw rotation and a spring element having an adjustable spring rate anchored on the end cap to resist the screw rotation beyond a predefined position.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The description provided below relates to a damping end-stop feature. The damping end-stop feature allows for decreased design margins and serves to prevent potential foreign object damage (FOD). The damping end-stop disclosed as part of one embodiment herein includes a torsional spring that absorbs large impact loads that occur on a full load and speed retraction instance. The torsional spring is preloaded and provides for a home position for normal stop conditions. If the home position is compromised, the torsional spring will reach and then surpass its pre-loaded limit and permit rotation until all energy in the ballscrew is dissipated or the ballscrew hits a final hard stop. As the torsional spring is activated, the torsional spring may respond linearly or non-linearly.

Figure 1:
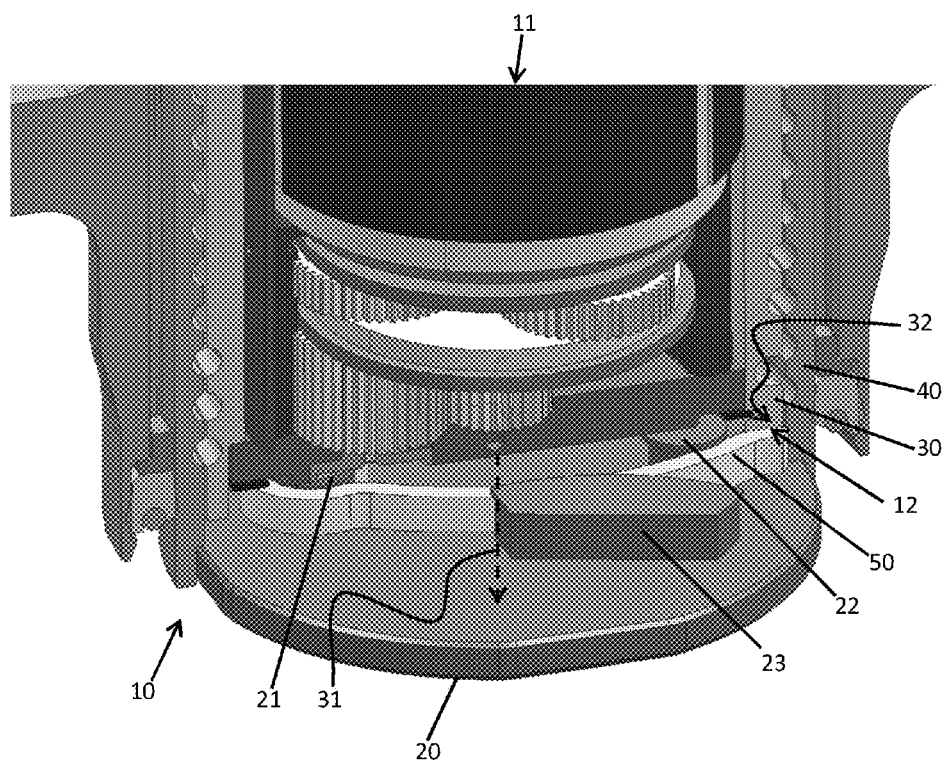
FIG. 1 is a cutaway perspective view of an electric braking apparatus in accordance with embodiments.
Figure 2:
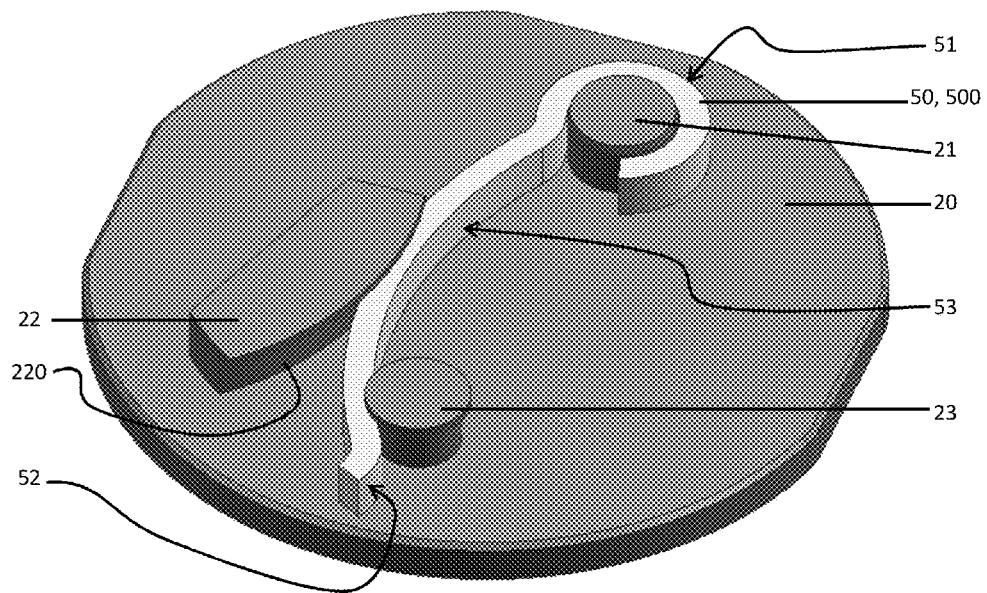
FIG. 2 is a perspective view of a torsional spring of the electric braking apparatus of FIG. 1.

With reference to FIGS. 1 and 2, an electric braking apparatus 10 is provided. The electric braking apparatus 10 includes an electromechanical actuator (EMA) 11 and a damping end-stop assembly 12. The EMA 11 is configured to apply an axial load on a brake stack. The damping end-stop assembly 12 is coupled to the EMA 11 and configured to convert an input torque, which is applied in a circumferential or angular direction to the damping end stop assembly 12, into torque that is directed circumferentially or angularly and is directly transmissible to the EMA 11. The damping end-stop assembly 12 is further configured to define a home braking position as being the fully retracted position of the EMA 11 and to increasingly resist further rotation beyond the home braking position.

The damping end-stop assembly 12 includes an end cap 20, a screw 30, a nut 40 and a spring element 50. The end cap 20 is a generally planar and circular plate that includes a first boss 21, a second boss 22 and a third boss 23. The first, second and third bosses 21, 22 and 23 will be described below in greater detail. The screw 30 is coupled to the EMA 11 and may be driven by the EMA 11 to rotate in clockwise or counter-clockwise directions. The screw 30 is disposed such that a longitudinal axis 31 thereof about which the screw 30 is rotatable extends through the end cap 20. The end cap 20 is disposed at an axial end of the nut 40.

The nut 40 is anchored to the end cap 20 in a rotational and translational manner and is threadably engaged with the screw 30. As such, the nut 40 is longitudinally movable with the end cap 20 relative to the screw 30 with screw 30 rotation. Thus, as the EMA 11 drives the screw 30 to rotate in a first direction (i.e., clockwise), the screw 30 causes the nut 40 to retract in an axial direction toward the screw 30 and thereby remove loading from a brake stack. By contrast, as the EMA 11 drives the screw 30 to rotate in the second direction (i.e., counter-clockwise), the rotation of the screw 30 causes the nut 40 to approach the brake stack in the axial direction away from the screw 30 and thereby apply load to the brake stack When the EMA 11 drives the screw 30 to rotate in the first direction and the screw causes the nut to retract from the brake stack toward the screw 30, the portion 32 of the screw 30 proximate to the end cap 20 moves in a spiraling direction toward the end cap 20. At or near to the fully retracted position, this movement of the portion 32 occurs proximate to the surface of the end cap 20.

The spring element 50 is anchored on the end cap 20 and configured to resist the screw 30 rotation beyond a predefined rotational position, which is akin to the above-noted home braking position. This predefined rotational position is associated with a fully or nearly fully retracted axial position of the nut 40 and, as mentioned above regarding the previous designs, screw rotation beyond this predefined rotational position was prevented by a hard end-stop whereby the portion 32 of the screw 30 proximate to the end cap 20 would impact the hard end-stop. In accordance with embodiments, however, the portion 32 impacts the spring element 50 and the spring element 50 permits a certain amount of screw 30 rotation beyond this predefined rotational position. In so doing, the spring element 50 dampens the forces applied by the screw 30 over this rotational distance. In this way, the hard end-stop of the previous designs is replaced by a more forgiving end-stop feature.

As shown in FIG. 2, the spring element 50 is provided as a torsional spring 500 and includes a hook portion 51, an end portion 52 and a curvilinear portion 53 that extends between the hook portion 51 and the end portion 52. The hook portion 51 hooks around and is therefore anchored to the first boss 21 of the end cap 20. As the outer diameter of the first boss 21 and the inner diameter of the hook portion 51 are each substantially circular and smooth, the hook portion 51 may be rotatable about the first boss 21. The end portion 52 is disposed at a distal end of the spring element 50 and reaches nearly out to an outer diameter of the end cap 20. Thus, the end portion 52 lies in the eventual path of the screw 30 as the screw 30 is driven to rotate by the EMA 11 in the direction associated with nut 40 retraction (i.e., the retraction direction).

Both the hook portion 51 and the end portion 52 are curved in a first direction in (i.e., parallel with) the plane of the end cap 20. The curvilinear portion 53 curves in a second direction in the plane of the end cap 20, with the second direction being defined oppositely with respect to the first direction. The curvilinear portion 52 thus abuts against the second boss 22 of the end cap 20 whereby the second boss 22 applies a bias to the spring element 50 to resist the rotation of the screw 30 beyond the predefined home position. The curvilinear portion 52 further abuts against the third boss 23 such that the third boss 23 pre-loads the spring element 50 against the second boss 22.

The second boss 22 includes a surface 220. The surface 220 is curved such that the resistance to the rotation of the screw 30 as provided by the spring element 50 (i.e., the spring rate of the spring element 50) is made to increase linearly or non-linearly with continued rotation of the screw 30. That is, in accordance with embodiments, the surface 220 may be formed such that the increase in resistance is linearly proportional with continued rotation of the screw 30 beyond the predefined home position. By contrast, in accordance with alternative embodiments, the surface 220 may be formed such that the increase in resistance is non-linearly proportional with continued rotation of the screw 30 beyond the predefined home position. In particular, the end cap 20, the second boss 22 and the spring element 50 may be configured to define a full stop position beyond which further rotation of the screw 30 is fully prevented.

Figure 3:
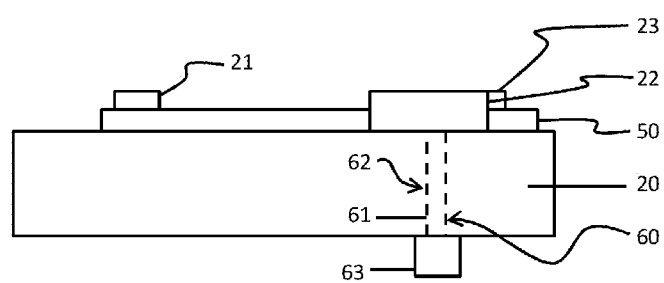
FIG. 3 is a radial view of an adjustment unit of the electric braking apparatus.

With reference to FIG. 3 and, in accordance with further embodiments, any one or more of the first boss 21, the second boss 22 and the third boss 23 may be manually or automatically adjustable in a radial or circumferential direction (i.e., in a direction in or parallel to the plane of the surface of the end cap 20). Such adjustment would have the effect of correspondingly changing the spring rate of the spring element 50. As shown in FIG. 3, the second boss 22 is coupled to an adjustment unit 60 that extends through the end cap 20. The adjustment unit 60 includes an elongate member 61 that extends from the second boss 22 through a guide groove 62 defined by the end cap 20 and an actuator 63. The actuator 63 is coupled to the elongate member 61 and operable by an operator. The operator can thus manipulate the actuator 63 to thereby affect the position, attitude and/or orientation of the second boss 22. Of course, it is to be understood that the position, attitude and/or orientation of the first boss 21 and the third boss 23 are similarly adjustable.

Figure 4:
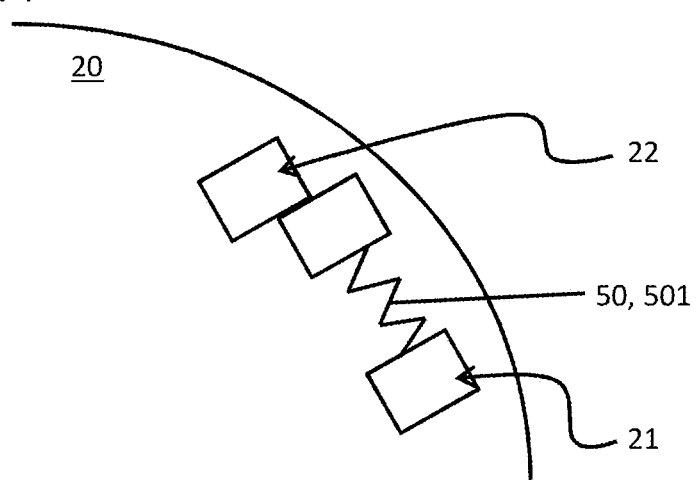
FIG. 4 is an axial view of a compression spring in accordance with exemplary alternative embodiments.

With reference to FIG. 4 and, in accordance with further alternative embodiments, the spring element 50 may be provided as a compression spring 501. In this case, the spring element 50 is anchored to the first boss 21 and pre-loaded by the second boss 22. In addition, the spring element 50 may be designed to have a constant spring constant with continued rotation of the screw 30 such that the resistance to the continued screw 30 rotation increases linearly or a variable spring constant with continued rotation of the screw 30 such that the resistance to the continued rotation of the screw 30 increases non-linearly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electric braking apparatus, comprising:
an electromechanical actuator (EMA) configured to apply an axial load on a brake stack; and
a damping end-stop configured to transmit torque into the EMA and comprising:

an end cap comprising first, second and third bosses;

a screw disposed such that a longitudinal axis about which the screw is rotatable extends through the end cap;

a nut threadably engaged with the screw and movable with the end cap relative to the screw with screw rotation; and a spring element anchored on the first boss, biased by the second boss to resist the screw rotation beyond a predefined position and pre-loaded by the third boss against the second boss.

2. The electric braking apparatus according to claim 1, wherein the spring is pre-loaded.

3. The electric braking apparatus according to claim 1, wherein a resistance to the screw rotation by the spring element increases linearly.

4. The electric braking apparatus according to claim 1, wherein a resistance to the screw rotation by the spring element increases non-linearly.

5. The electric braking apparatus according to claim 1, wherein the end cap and the spring element define a full stop position beyond which the screw rotation is prevented.

6. An electric braking apparatus, comprising:

an electromechanical actuator (EMA) configured to apply an axial load on a brake stack; and a damping end-stop configured to transmit torque into the EMA and comprising:

an end cap;

a screw disposed such that a longitudinal axis about which the screw is rotatable extends through the end cap;

a nut threadably engaged with the screw and movable with the end cap relative to the screw with screw rotation; and a spring element anchored on the end cap to resist the screw rotation beyond a predefined position, the spring element comprising:

a hook portion to be anchored on the end cap;

an end portion to contact the screw at the predefined position; and a curvilinear portion extending between the hook portion and the end portion.

7. The electric braking apparatus according to claim 1, wherein the spring element comprises a torsional spring.

8. The electric braking apparatus according to claim 1, wherein the spring element comprises a compression spring.

9. A damping end-stop for coupling to an electro-mechanical actuator of an electric braking apparatus, the damping end-stop comprising:

an end cap comprising first, second and third bosses;

a screw disposed such that a longitudinal axis about which the screw is rotatable extends through the end cap;

a nut threadably engaged with the screw and movable with the end cap relative to the screw with screw rotation; and a spring element anchored on the first boss, biased by the second boss to resist the screw rotation beyond a predefined position and pre-loaded by the third boss against the second boss.

10. The electric braking apparatus according to claim 9, wherein the spring is pre-loaded.

11. The electric braking apparatus according to claim 9, wherein a resistance to the screw rotation by the spring element increases linearly.

12. The electric braking apparatus according to claim 9, wherein a resistance to the screw rotation by the spring element increases non-linearly.

13. The electric braking apparatus according to claim 9, wherein the end cap and the spring element define a full stop position beyond which the screw rotation is prevented.

14. The electric braking apparatus according to claim 9, wherein the spring element comprises a torsional spring.

15. The electric braking apparatus according to claim 9, wherein the spring element comprises a compression spring.

16. A damping end-stop for coupling to an electro-mechanical actuator of an electric braking apparatus, the damping end-stop comprising:

an end cap;

a screw disposed such that a longitudinal axis about which the screw is rotatable extends through the end cap;

a nut threadably engaged with the screw and movable with the end cap relative to the screw with screw rotation; and a spring element anchored on the end cap to resist the screw rotation beyond a predefined position, the spring element comprising:

a hook portion to be anchored on the end cap;

an end portion to contact the screw at the predefined position; and a curvilinear portion extending between the hook portion and the end portion.

17. An electric braking apparatus, comprising:

an electromechanical actuator (EMA) configured to apply an axial load on a brake stack; and a damping end-stop configured to transmit torque into the EMA and comprising:

an end cap;

a screw disposed such that a longitudinal axis about which the screw is rotatable extends through the end cap;

a nut threadably engaged with the screw and movable with the end cap relative to the screw with screw rotation; and a spring element having a spring rate, which is adjustable through the end cap, the spring element being anchored on the end cap to resist the screw rotation beyond a predefined position.

18. The electric braking apparatus according to claim 17, further comprising an adjustment unit comprising:

an elongate member extending from an anchoring of the spring element through a guide groove defined in the end cap; and an actuator coupled to the elongate member, the actuator being operable to adjust the anchoring of the spring element in or parallel to a plane of a surface of the end cap to thereby adjust the spring rate of the spring element.

* * * * *